(12) United States Patent
Kumar

(10) Patent No.: US 7,079,285 B2
(45) Date of Patent: Jul. 18, 2006

(54) EFFICIENT RASTERIZING SUB-SYSTEM FOR PRINTERS

(75) Inventor: Santhosh Trichur Natrajan Kumar, Trichur (IN)

(73) Assignee: Texas Instruments Incorporated, Dallas, TX (US)

( * ) Notice: Subject to any disclaimer, the term of this patent is extended or adjusted under 35 U.S.C. 154(b) by 812 days.

(21) Appl. No.: 10/119,051

(22) Filed: Apr. 10, 2002

(65) Prior Publication Data

US 2003/0193681 A1  Oct. 16, 2003

(51) Int. Cl.
*G06F 15/00* (2006.01)
*G06F 1/00* (2006.01)

(52) U.S. Cl. .......................... 358/1.9; 358/1.3; 358/1.8; 358/3.06; 358/3.12; 358/3.23; 358/1.15; 358/1.16; 358/524; 358/534; 358/444

(58) Field of Classification Search .................. 358/1.9, 358/1.15, 1.16, 1.17, 3.06, 3.23, 524, 534, 358/444; 382/162
See application file for complete search history.

(56) References Cited

U.S. PATENT DOCUMENTS

| | | | |
|---|---|---|---|
| 6,449,058 B1 * | 9/2002 | Ueda | 358/1.16 |
| 6,456,390 B1 * | 9/2002 | Okubo et al. | 358/1.17 |
| 6,490,055 B1 * | 12/2002 | Shimizu | 358/1.9 |
| 6,751,346 B1 * | 6/2004 | Shimizu | 382/162 |
| 7,009,729 B1 * | 3/2006 | Fujita | 358/1.3 |

* cited by examiner

*Primary Examiner*—Kimberly Williams
*Assistant Examiner*—Satwant Singh
(74) *Attorney, Agent, or Firm*—Robert D. Marshall, Jr.; W. James Brady; Frederick J. Telecky, Jr.

(57) ABSTRACT

Image content may be generated in high resolution by performing raster operations, and half-toning is then performed on the image content. Due to such a sequence, a substantially consistent image may be generated on different printers irrespective of the degree of half-toning. Another aspect of the present invention enables the computation requirements to be reduced by storing in a temporary buffer the image data (paint, destination, source) used multiple times.

17 Claims, 2 Drawing Sheets

EFFICIENT RASTERIZING SUB-SYSTEM FOR PRINTERS

BACKGROUND OF THE INVENTION

1. Field of the Invention

The present invention relates to printers, and more specifically to a rasterizing sub-system used in a printer.

2. Related Art

Printers are often used to print a specified content on medium such as paper. Typically, a printer receives a request from an external system such as a personal computer, and prints the content specified in the request. The content to be printed is generally specified by page description languages (PDL) such as Postscript (PS) and printer control language (PCL), as is well known in the relevant arts.

Printers often contain rasterizer sub-systems for generating a bit map representing the page content to be printed. The bit map is generally generated according to the PDL statements as is well known in the relevant arts. Rasterizer sub-systems often need to be implemented meeting several features. One feature is to minimize the usage of memory and/or processing requirements.

Another desirable feature that is to be supported by a rasterizer sub-system is half toning. Half toning in generally refers to obtaining a particular shade of a color by generating dots of varying color intensity very close to each other. For example, a printer may support only black and white (i.e., no printing) dots, and a grey color may be obtained by printing a number of black dots proportionate to the desired color intensity within a small area (often referred to as half-tone cell). As the human eye inherently 'averages' the colors in a close/small area, the area (in each cell) may be perceived to contain a grey shade.

What is therefore needed is a method and apparatus which supports rasterization to generate bit maps suitable for printing on a printer while meeting one or more requirements.

SUMMARY OF THE INVENTION

According to one aspect of the present invention, a bit map is generated by performing a raster operation (on a source, paint and destination), and then performing a half-toning operation on the output generated by the raster operation. Due to such a sequence, the content (other than the color) of a printed image may be substantially the same irrespective of the degree of half-toning.

According to another aspect of the present invention, a temporary buffer is provided to store image data which can be used multiple times in generating a destination image. For example, a pattern used multiple times for a raster operation, may be generated and stored in the temporary buffer.

Similarly, if a group of lines of different lengths have the same pixel/display value at the same relative position (in X-direction) to the extent the lines cover the position, the longest line may be computed and stored. In addition, the start and end points of each line may also be stored. Thus, using the start/end points and the data for the longest line, the remaining lines may be generated quickly.

According to another aspect of the present invention, mask data used for transparency operation may be stored at a low resolution (bits per each position of the mask). The mask data is expanded to a resolution at which raster operations are performed, and the raster operation is performed using the expanded data. The mask data at a lower resolution may be generated by an interpreter and provided in the form of a display list such that a rendering module can store the mask data in a temporary buffer.

One more aspect of the present invention causes both source element and pattern to be stored in entirety in a temporary buffer in an embodiment implemented substantially in software. As a result, the number of calls to a source rendering module and pattern rendering module may be minimized. However, if the temporary buffer is not sufficiently large to store both the source and the pattern, a number of lines of the source and pattern respectively are stored (in the temporary buffer) so as to maximize the number of destination lines generated based on the stored data. As a result, the number of calls to the source and pattern rendering modules may be minimized, thereby minimizing the processing requirements in a software implementation.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein.

DETAILED DESCRIPTION OF THE PREFERRED EMBODIMENTS

1. Overview and Discussion of the Invention

According to an aspect of the present invention, half toning is performed on the image after the raster operations are applied. Raster operations may be performed on a source image, a destination image and a paint to obtain a final image. By performing the half-toning operation on the final image (generated by the raster operations), the content of a printed image may be substantially the same irrespective of the degree of half-toning.

According to another aspect of the present invention, image data used many times for performing raster operations, is stored in a temporary buffer such that the data need not be regenerated. As a result, the image may be generated while minimizing the processing requirements and/or memory access requirements.

Several aspects of the invention are described below with reference to example environments for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention.

2. Example Printer

Figure 1:
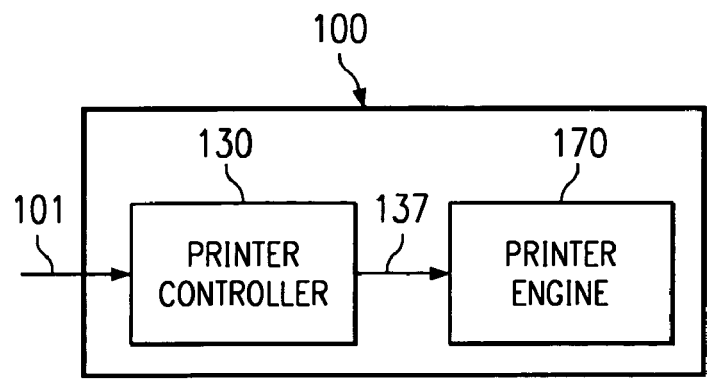
FIG. 1 is a block diagram illustrating the details of an embodiment of a printer.

FIG. 1 is a block diagram illustrating the details of an embodiment of printer 100 in accordance with the present invention. Printer 100 is shown containing printer controller 130 and printer engine 170. Each component is described in further detail below.

Printer engine 170 receives on path 137 a bitmap suitable in format for printing, and prints the bit map on medium such as paper. Printer engine 170 can be implemented in a known way. In an embodiment, printer engine 170 is implemented using laser technology.

Printer controller 130 may contain a rasterizer sub-system which receives statements (defining a page content to be printed) on path 101, and generates a bitmap representing the page content. The rasterizer sub-system sends the generated bit maps on path 137. The statements may be received from an external computer system (not shown), and be specified in a page description language (PDL) such as Printer Control Language (PCL) or PostScript, well known in the relevant arts.

The manner in which printer controller 130 may generate the bit maps of superior image quality while potentially reducing processing time and/or memory requirements is described below.

3. Method

Figure 2:
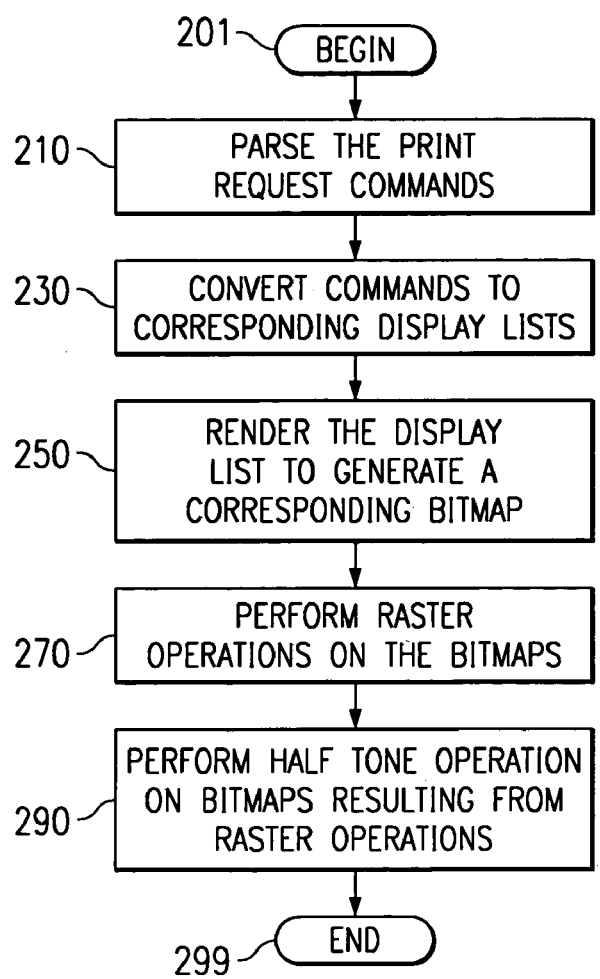
FIG. 2 is a flow chart illustrating a method in accordance with an aspect of the present invention.

FIG. 2 is a flow chart illustrating a method by which a rasterizer sub-system may generate half-toned images according to an aspect of the present invention. The method is described with reference to FIG. 1 for illustration. However, the method can be implemented in other printers as well. The method begins in step 201, in which control immediately passes to step 210.

In step 210, statements received on line 101 are parsed by a parser implemented within printer controller 130. The statements are generally received in a page description language (PDL) format such as PostScipt and Printer Controller Language (PCL). Parsing may be performed in a known way.

In step 230, the statements are converted into a corresponding display list. Each display list contains elements such as trapezoids and lines. In step 250, each element in the display list is rendered to generate a corresponding bitmap. Rendering and conversion may also be performed in a known way.

In step 270, raster operations may be preformed using a source image, paint and destination image. Each raster operation generally causes a portion of a final image to be generated. The entire final image is typically generated after processing all the elements in display lists. In general, each of the steps of FIG. 2 may be performed multiple times (iterations) in generating the final image.

In step 290, half toning operation is performed on the final image generated by the raster operations. Typically, the image generated by the raster operations is converted into another resolution determined by implementation of printer engine 170. For example, the final image generated by raster operations may be generated in 16 bit resolution (i.e., each pixel being represented by 16 bits), and the half-toned image may have only 4-bit resolution. One of several known approaches may be used to half tone a final image generated by the raster operations.

One potential advantage of the approach of FIG. 2 (in comparison to an alternative approach in which the source, paint and destination images are first half-toned and then raster operations are performed) is that the content of the printed images may be consistently the same irrespective of the degree of half-toning. In contrast, in the alternative approach, the content of the printed images can vary for different printing resolutions depending on the approaches taken for upscaling and half-toning the source/paint images.

The consistency of image content in the described embodiments results from the fact that the final image is generated independent of the resolution to which the image has to be half-toned. In contrast, in the alternative approach, 'information may be lost' prior to raster operations as the half toning is performed before raster operations.

In addition to image quality, other aspects of the present invention enable memory and/or processing power requirements as described below with reference to an embodiment of printer controller 130.

4. Printer Controller

Figure 3:
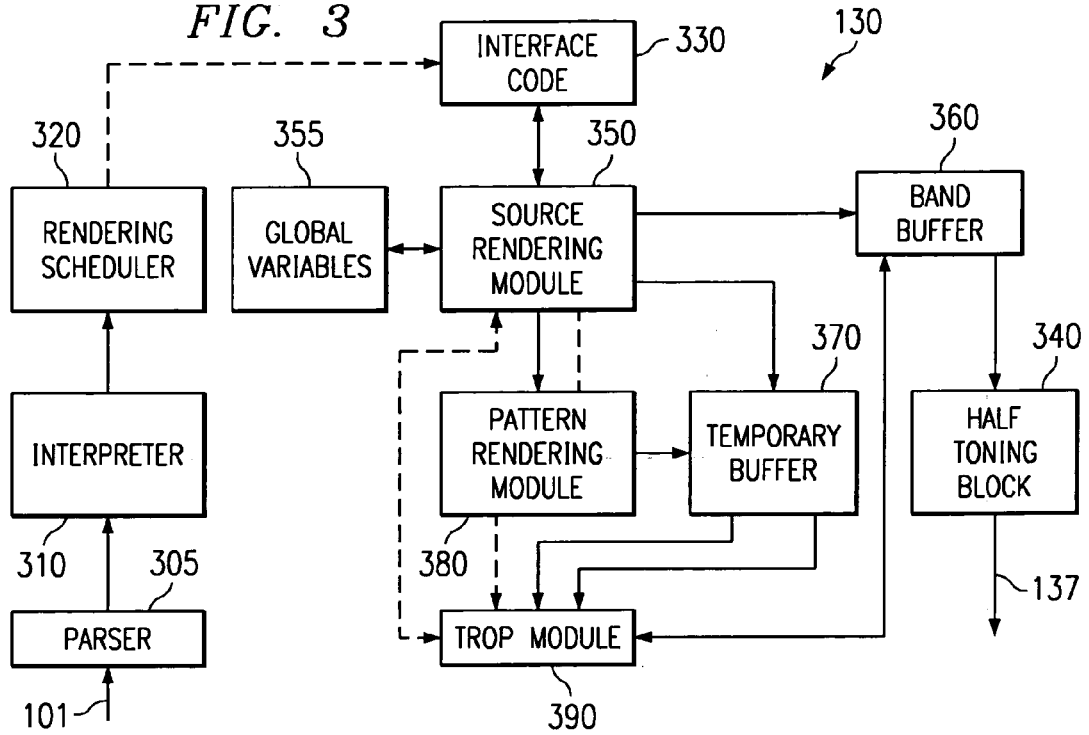
FIG. 3 is a block diagram illustrating the details of an embodiment of printer controller implemented in accordance with the present invention.

FIG. 3 is a diagram illustrating the details of an embodiment of printer controller 130 implemented in accordance with the present invention. Printer controller 130 is shown containing parser 305, interpreter 310, rendering scheduler 320, interface code 330, half-toning module 340, source rendering module 350, global variables block 355, band buffer 360, temporary buffer 370, pattern rendering module 380, transparency and raster operation (TROP) module 390. In FIG. 3, the control path is represented by broken lines and data path is represented by solid lines. Each component is described in further detail below.

Parser 305 ensures that the statements (describing a page content) received on path 101 are consistent with a page description language (PDL), and passes the received statements to interpreter 310. Interpreter 310 converts any necessary statements to a corresponding display list. The display list may contain primitives (basic shapes such as trapezoids, lines, etc.) representing the elements in the print statements. Parser 305 and interpreter 310 may be implemented in a known way.

Rendering scheduler 320 schedules the primitives for subsequent processing (rendering). One of several well known approaches may be used to implement rendering scheduler 320. Interface code 330 provides the interface between rendering scheduler 320 and source rendering module 350. In general, interface code 330 interfaces with rendering scheduler 320, and performs various initializations required for rendering modules. Rendering scheduler 320 and interface module 330 may be implemented in a known way.

Global variables 355 represents various values used for rendering and other operations which generate bit maps representing page content. For example, the variables stored may include start and end of line numbers for a band, any global clipping parameters for band, ROP value for band. In an embodiment, if ROP value is changed, the change may be inserted as a display list for ease of processing.

Source rendering module 350 generates a bitmap for necessary elements of a display list. The generated bit map ("source element") is generally used as a source in a raster operation (ROP). As is well known with reference to PostScript and PCL languages, each ROP is specified by three operands (source, paint and destination) using basic operations such as AND, OR, NOT and XOR.

When only a simple raster operation (ROP) is to be performed on the bitmap, source rendering module 350 performs the ROP and stores the resultant bitmap in band buffer 360. For example, if a generated bit map is to overwrite a corresponding portion in band buffer 360, the generated bit map may be stored directly in band buffer 360 without any additional processing.

On the other hand, when a complex ROP and/or transparency operation is to be performed on the bit map (source element), the bit map needs to be passed to TROP module 390. The bit map may be generated line-by-line, and stored in buffer 370 for further processing by TROP module 390. An aspect of the present invention enables bit maps used multiple times by TROP module 390, to be stored in buffer 370 and reused several times as described below.

Pattern rendering module 380 generates a paint which may be used to fill up the source or destination image described above as may be specified by the statements. In general, paint may refer to a pattern or a shade of a color used to fill up & source image. The paint thus generated may also be stored in temporary buffer 370. An aspect of the present invention enables the paint (or portions thereof) bit maps used many times to be stored in temporary buffer 370 such that the paint bit maps need not be generated several times.

Transparency and raster operation (TROP) module 390 perform raster operations on the source image, paint and the destination image. Destination image generally refers to the rendered primitives existing on the bitmap. The data pertaining to the source image and the paint may be received from temporary buffer 370. Raster operations generate data representing the destination image, resulting in the final image after performance of all raster operations.

Typically, raster operations are performed in several iterative blocks for a display list element. In each iteration, an operation may be performed on the source image, paint and the destination image (which is blank initially) to generate a new destination image. The image generated at the end of all iterations represents the final image representing the page content to be printed. The final image may be stored in band buffer 360. TROP module 390 can be implemented in a known way.

Half-toning block 340 half-tones the final image to generate a bit map suitable for sending to printer engine 170. The bit map represents the page content specified by statements received on path 101. The page content may be printed by sending the bit map to printer engine 170 on path 137.

Only the details as relevant to an understanding of the described embodiments are provided herein. For further details, the reader is referred to a book entitled, "Real World Scanning Halftones" by David Blatner and Steve Roth, Published by Peachpit press, which is incorporated in its entirety into the present application herewith.

Temporary buffer 370 provides buffer for transfer of image data between various modules. Several efficiencies may be attained in providing such buffer as described below in further detail with reference to an example embodiment of temporary buffer 370.

5. Usage of Temporary Buffer

According to an aspect of the present invention, the image data used multiple times is stored in temporary buffer 370. The manner in which different types of image data may be stored and used is described below. As may be appreciated, such storage leads to reduction of processing power requirements.

When the same content is to be replicated into multiple lines of a destination image, the content may be stored in temporary buffer 370 such that the same data need not be regenerated multiple times. For example, if an image (source or paint) is expanded (up scaled) to contain the same line replicated multiple times and if the expanded image is to overwrite the destination image, it may be determined in the rendering module (350 or 380) that the same data is to be replicated multiple times in the destination image.

In general, when a destination image is not used in a ROP and the same line content is to be replicated into multiple lines of a destination image, TROP 390 may store the corresponding line in temporary buffer 370 for later copying. For example, assume a source element is to be upscaled by a factor of 5 and a pattern is to be upscaled by a factor of 3 in the Y-direction. The first destination line may be used 3 times, the second destination line may be used twice, etc., as may be readily appreciated. Accordingly, when the line is generated the first time, a copy is placed in temporary buffer 370.

TROP module 390 may then simply copy the specified lines, instead of re-computing the data for the corresponding portions. To facilitate the re-use of image data, a guide table may contain data indicating the manner in which a line is to be replicated. For example, the data may indicate a starting line number and the number of times a line has to be repeated.

Another aspect of the present invention minimizes the computation requirements when all lines of a group contain the same image data in the same position (to the extent the corresponding line spans the position). The aspect is illustrated with an example of FIG. 4.

Figure 4:
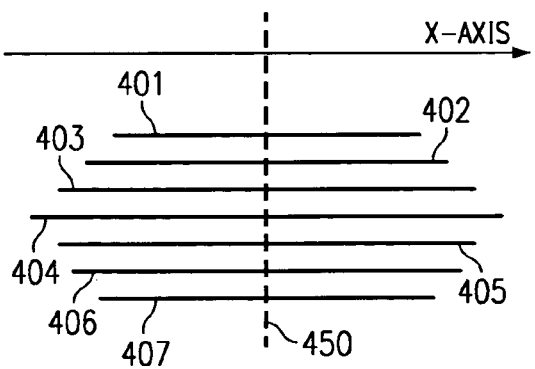
FIG. 4 is diagram containing several lines illustrating the manner in which the processing requirements may be minimized according to an aspect of the present invention.

FIG. 4 is shown containing lines 401–407, with different start and end points. X-axis is shown for convenience only. All of lines 401–407, to the extent spanning a point (e.g., point 450), are assumed to have the same display/pixel value at the same point.

Thus, according to an aspect of the present invention, pattern rendering module 380 (or source rendering module 350) computes the data representing the longest line (404), and stores the data in temporary buffer 370. The data may be stored in the guide table noted above. The guide table may further store the start and end of each line such that TROP module 390 is provided sufficient information to simply copy the lines into band buffer 360 (instead of re-computing the lines).

While the above example is described with reference to a longest line having minimum X-coordinate (among the set of lines 401–407) on the left hand side and maximum X-coordinate on the right hand side, it should be appreciated that an imaginary longest line may be constructed based on the minimum and maximum X-coordinate of a set of lines. The data representing such imaginary longest line may be first generated, and the data may be stored and used as described above to generate all the set of lines.

According to another aspect of the present invention, the memory requirements in temporary buffer 370 may be minimized in supporting transparency. Mask data may be associated with source and paint, with the mask data specifying the specific areas of transparency. In an embodiment, the mask data is specified as 1-bit data, which is expanded (1 to all ones and 0 to all zeros) to equal the bit resolution at which the raster operations are performed. The raster operation is performed using the expanded form.

Interpreter 310 may generate the mask data in 1-bit form and include the data in the form of a display list. Source rendering module 350 and pattern rendering module 380 respectively store the source and pattern related masks in temporary buffer 370. TROP 390 expands the mask data and performs a ROP and transparency operations using the expanded mask data, the source, paint and destination. As a result, the amount of memory required to store mask data may be minimized.

The description is continued with reference to an embodiment of printer controller 130, in which several features of the present invention are caused to be operative by using software. However, several embodiments can be implemented in a combination of hardware, software and/or firmware without departing from the scope and spirit of the present invention.

6. Software Implementation

Figure 5:
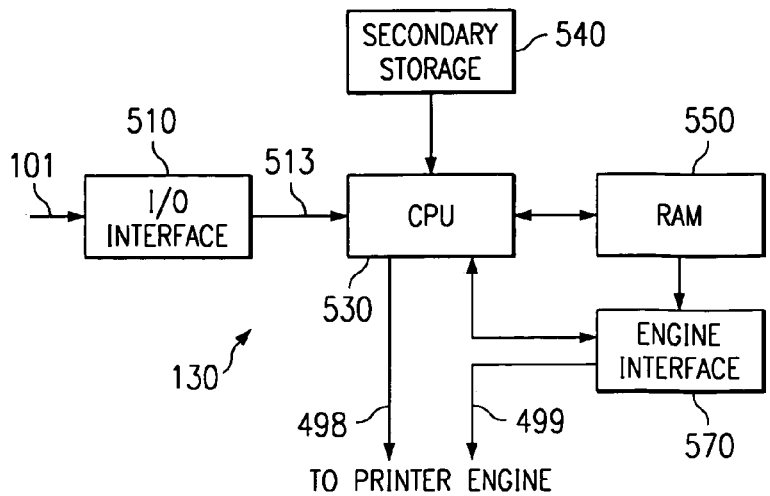
FIG. 5 is a block diagram illustrating the details of a printer controller illustrated substantially in the form of software.

FIG. 5 is a block diagram illustrating the details of printer controller 130 according to an aspect of the present invention. Printer controller 130 is shown containing input/output (I/O) interface 510, central processing unit (CPU) 530, random access memory (RAM) 550 and engine interface 570. Each component is described below in further detail.

Input/output interface 510 provides the interface with an external system such as personal computer. I/O interface receives statements on path 101 requesting to print a page content specified in a page description language (PDL) such as Printer Control Language (PCL) or PostScript. I/O interface 510 forwards the statements to CPU 530 on line 513.

Engine interface 570 provides an interface between printer controller 130 and printer engine 170. Lines 498 and 499 together represent line 137 illustrated in FIG. 1. Engine interface 570 may be implemented in a known way.

Secondary memory 540 may contain units such as hard drive (not shown), removable storage (e.g., flash memory, also not shown). Secondary storage 540 may store software instructions and data, which enable CPU 530 to provide several features in accordance with the present invention. The software instructions may be provided to CPU 530 from other sources such as over a network implemented using protocols such as TCP/IP.

CPU 530 executes the instructions provided from secondary memory to process the print statements and generate bit maps representing the page content, for example, as described in the previous sections. The instructions may also cause the bitmap to be provided to printer engine 170 on path 498.

An embodiment of the present invention is implemented using software running (that is, executing) in printer controller 130. In this document, the term "computer program product" is used to generally refer to removable storage unit or hard disk installed in hard drive. These computer program products are means for providing software to printer 100. These computer program products generally contain computer readable medium providing software to printer controller 130. The computer readable medium can be provided external to printer controller 130.

RAM 550 may be used to store the instructions prior to execution. In addition, RAM 550 may be used to implement temporary buffer 370 and band buffer 360. It may be desirable to use the memory space available in temporary buffer 370 efficiently at least due to such sharing and due the use of additional memory space to conserve the processing power (as described in previous sections). The manner in which the memory space in temporary buffer 370 may be used is described below.

7. Additional Optimizations

As noted above, temporary buffer 370 may also contain source and paint data representing the lines of the source image and the paint on which the raster operations are required to be performed. As the available memory space (for example, in RAM 550 described above) may need to be shared, it is generally necessary to implement an approach for sharing the available memory space.

A criteria for division (of memory space allocated to temporary buffer 370) is to attempt to store an entire pattern/paint such that the number of iterations between source rendering module 350 and pattern rendering module 380 are minimized. Source rendering module 350 may then call pattern rendering module 380 only once during rendering of an object, and the same pattern stored efficiently in temporary buffer 370 can be used for multiple rendering calls.

If an entire pattern and corresponding source element does not fit in the allocated space, rendering modules may fit a number of lines source and paint in such a way that a maximum number of destination lines (or maximum image portion, in general) can be generated from the stored data. This will reduce the number of iterations between source rendering module 350 and pattern rendering module 380 in the software implementation of FIG. 5.

Such computation of how many lines of source (which includes the image or font data) as well as the number of lines of pattern can be computed up-front (within interpreter 310 of FIG. 3) when the elements are added to the display list itself. Thus, whenever there is a change of number of lines of either the source (N1) or pattern (N2) is changed, an element indicating that is introduced into the display list. The element may be used by source rendering module 350 and pattern rendering module 380 in generating and storing data in temporary buffer 370. Thus, the usage of temporary buffer is dynamically configured.

Thus, the present invention can be used to efficiently generate a destination image efficiently at a (high) resolution in which raster operations are performed. The high resolution image can then be half-toned such that the same image is generated on printers of different resolutions, as noted above.

8. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A method of processing a plurality of statements in a page description language, said plurality of statements specifying a page content for printing using a printer engine, said method being performed in a printer, said method comprising:

receiving said plurality of statements;

converting some of said plurality of statements to a plurality of display elements;

rendering said plurality of display elements to generate a corresponding plurality of lines;

generating a destination image by performing a plurality of raster operations on a source, a pattern and a destination using said plurality of lines according to said plurality of statements, wherein said destination is used as a new destination for a subsequent raster operation, said destination image representing said page content;

storing in a temporary buffer an image portion used in raster operations multiple times such that said image portion need not be re-computed said multiple times;

storing said destination image in a band buffer; and half-toning said destination image received from said band buffer to generate a bit map suitable for printing using said printer engine.

2. The method of claim 1, wherein said image portion comprises a plurality of similar lines having the same pixel/display value at a same position to the extent the line spans said same position, said method further comprises:

storing a start point and an end point for each of said plurality of similar lines;

computing data representing a longest line in said plurality of lines, wherein said image portion comprises said longest line and said data representing said longest line is stored in said temporary buffer; and determining data representing said plurality of similar lines, other than said longest line, based on said longest line, said start point and said end point.

3. The method of claim 2, wherein said image portion comprises one of said pattern and said source, and wherein said longest line comprises an imaginary line based on a minimum X-coordinate on the left hand side of said plurality of similar lines and a maximum X-coordinate on the right hand side of said plurality of similar lines.

4. The method of claim 1, wherein said printer supports transparency, said method further comprising:

storing a transparency mask at a low resolution in a temporary buffer;

expanding said transparency mask to a higher resolution; and performing a transparency operation using said transparency mask at said higher resolution.

5. The method of claim 4, further comprising:

generating a display list containing said mask data at a lower resolution; and sending said display list for storing in said temporary buffer.

6. A printer controller processing a plurality of statements in a page description language, said plurality of statements specifying a page content for printing using a printer engine, said printer controller comprising:

means for receiving said plurality of statements;

means for converting some of said plurality of statements to a plurality of display elements;

means for rendering each of said plurality of display elements to generate a corresponding plurality of lines;

means for generating a destination image by performing a plurality of raster operations on a source, a pattern and a destination to generate a new destination, according to said plurality of statements, wherein said destination is used as a new destination for a subsequent raster operation, said destination image representing said page content;

means for storing in a temporary buffer an image portion used multiple times such that said image portion need not be re-computed said multiple times;

means for storing said destination image in a band buffer; and means for half-toning said destination image receiving said destination image from said band buffer to generate a bit map suitable for printing using said printer engine.

7. The printer controller of claim 6, wherein said image portion comprises a plurality of similar lines having the same pixel/display value at a same position to the extent the line spans said same position, said printer controller further comprises:

means for storing a start point and an end point for each of said plurality of similar lines;

means for computing data representing a longest line in said plurality of lines, wherein said image portion comprises said longest line and said data representing said longest line is stored in said temporary buffer; and means for determining data representing said plurality of similar lines, other than said longest line, based on said longest line, said start point and said end point.

8. The printer controller of claim 7, wherein said image portion comprises one of said pattern and said source, and wherein said longest line comprises an imaginary line based on a minimum X-coordinate on the left hand side of said plurality of similar lines and a maximum X-coordinate on the right hand side of said plurality of similar lines.

9. The printer controller of claim 6, wherein said printer supports transparency, said printer controller further comprising:

means for storing a transparency mask at a low resolution in a temporary buffer;

means for expanding said transparency mask to a higher resolution; and means for performing a transparency operation using said transparency mask at said higher resolution.

10. The printer controller of claim 9, further comprising:

means for generating a display list containing said mask data at a lower resolution; and means for sending said display list for storing in said temporary buffer.

11. A computer program product for use with a printer, said computer program product comprising a computer usable medium having computer readable program code embodied in said computer usable medium, said computer readable program code processing a plurality of statements in a page description language, said plurality of statements specifying a page content for printing using a printer engine, said computer program product comprising:

receiving said plurality of statements;

converting some of said plurality of statements to a plurality of display elements;

rendering said plurality of display elements to generate a corresponding plurality of lines;

generating a destination image by performing a plurality of raster operations on a source, a pattern and a destination using said plurality of lines according to said plurality of statements, wherein said destination is used as a new destination for a subsequent raster operation, said destination image representing said page content;

storing in a temporary buffer an image portion used in raster operations multiple times such that said image portion need not be re-computed said multiple times;

storing said destination image in a band buffer; and half-toning said destination image received from said band buffer to generate a bit map suitable for printing using said printer engine.

12. The computer program product of claim 11, wherein said image portion comprises a plurality of similar lines having the same pixel/display value at a same position to the extent the line spans said same position, said computer program product further comprises:

storing a start point and an end point for each of said plurality of similar lines;

computing data representing a longest line in said plurality of lines, wherein said image portion comprises said longest line and said data representing said longest line is stored in said temporary buffer; and determining data representing said plurality of similar lines, other than said longest line, based on said longest line, said start point and said end point.

13. The computer program product of claim 12, wherein said image portion comprises one of said pattern and said source.

14. The computer program product of claim 11, wherein said printer supports transparency, said computer program product further comprising:

storing a transparency mask at a low resolution in a temporary buffer;

expanding said transparency mask to a higher resolution; and performing a transparency operation using said transparency mask at said higher resolution.

15. The computer program product of claim 14, further comprising:

generating a display list containing said mask data at a lower resolution; and sending said display list for storing in said temporary buffer.

16. A method of processing a plurality of statements in a page description language, said plurality of statements specifying a page content for printing using a printer engine, said method being performed in a printer, said method comprising:

receiving said plurality of statements;

converting some of said plurality of statements to a plurality of display elements;

rendering said plurality of display elements to generate a corresponding plurality of lines using a source rendering module to generate a source and a pattern rendering module to generate a pattern;

generating a destination image by performing a plurality of raster operations on a source, a pattern and a destination using said plurality of lines according to said plurality of statements, wherein said destination is used as a new destination for a subsequent raster operation, said destination image representing said page content;

if an entire source portion and an entire pattern portion for a raster operation can fit in a predetermined size of a temporary buffer, storing in the temporary buffer the entire source portion and the entire pattern portion for the raster operation such that a corresponding portion of said final image can be generated from the data stored in said temporary buffer without calling said source rendering module and said pattern rendering module multiple times;

if an entire source portion and an entire pattern portion for a raster operation cannot fit in a predetermined size of said temporary buffer, storing in the temporary buffer a number of lines of the entire source portion and said number of lines of the entire pattern portion for the raster operation such that a maximum number of destination lines are generated from said number of lines stored in said temporary buffer; and storing said destination image in a band buffer; and half-toning said destination image to generate a bit map suitable for printing using said printer engine.

17. A computer program product for use with a printer, said computer program product comprising a computer usable medium having computer readable program code embodied in said computer usable medium, said computer readable program code processing a plurality of statements in a page description language, said plurality of statements specifying a page content for printing using a printer engine, said computer program product comprising:

receiving said plurality of statements;

converting some of said plurality of statements to a plurality of display elements;

rendering said plurality of display elements to generate a corresponding plurality of lines using a source rendering module to generate a source and a pattern rendering module to generate a pattern;

generating a destination image by performing a plurality of raster operations on a source, a pattern and a destination using said plurality of lines according to said plurality of statements, wherein said destination is used as a new destination for a subsequent raster operation, said destination image representing said page content;

if an entire source portion and an entire pattern portion for a raster operation can fit in a predetermined size of a temporary buffer, storing in the temporary buffer the entire source portion and the entire pattern portion for the raster operation such that a corresponding portion of said final image can be generated from the data stored in said temporary buffer without calling said source rendering module and said pattern rendering module multiple times;

if an entire source portion and an entire pattern portion for a raster operation cannot fit in a predetermined size of said temporary buffer, storing in the temporary buffer a number of lines of the entire source portion and said number of lines of the entire pattern portion for the raster operation such that a maximum number of destination lines are generated from said number of lines stored in said temporary buffer; and storing said destination image in a band buffer; and half-toning said destination image to generate a bit map suitable for printing using said printer engine.

* * * * *